US012749467B2

United States Patent
(12) United States Patent
Martini

(10) Patent No.: US 12,749,467 B2
(45) Date of Patent: Sep. 29, 2026

(54) PLECTRUM WITH A THREE-DIMENSIONAL STRUCTURE

(71) Applicant: Marco Martini, Alba (IT)

(72) Inventor: Marco Martini, Alba (IT)

(73) Assignee: Marco Martini, Alba (IT)

( * ) Notice: Subject to any disclaimer, the term of this patent is extended or adjusted under 35 U.S.C. 154(b) by 264 days.

(21) Appl. No.: 18/684,641

(22) PCT Filed: Aug. 9, 2022

(86) PCT No.: PCT/EP2022/072307
§ 371 (c)(1),
(2) Date: Feb. 16, 2024

(87) PCT Pub. No.: WO2023/020886
PCT Pub. Date: Feb. 23, 2023

(65) Prior Publication Data
US 2025/0124897 A1 Apr. 17, 2025

(30) Foreign Application Priority Data
Aug. 20, 2021 (IT) ........................ 102021000022121

(51) Int. Cl.
*G10D 3/173* (2020.01)

(52) U.S. Cl.
CPC .................................... *G10D 3/173* (2020.02)

(58) Field of Classification Search
CPC ............. G10D 3/173; G10D 1/06; G10D 1/08
See application file for complete search history.

(56) References Cited

U.S. PATENT DOCUMENTS

| | | | | | |
|---|---|---|---|---|---|
| 4,347,773 | A * | 9/1982 | Zook | G10D 3/173 | 84/322 |
| 5,859,377 | A | 1/1999 | Mackey et al. | | |
| 7,786,362 | B1 * | 8/2010 | Whetstine | G10D 3/173 | 84/320 |
| 2007/0079685 | A1 * | 4/2007 | Mizek | G10D 3/173 | 84/322 |
| 2012/0260788 | A1 * | 10/2012 | Leneman | G10D 3/173 | 84/322 |

FOREIGN PATENT DOCUMENTS

| | | | | |
|---|---|---|---|---|
| DE | 202004000875 U1 * | 4/2004 | G10D 3/173 |
| FR | 2899713 A1 * | 10/2007 | G10D 3/173 |

OTHER PUBLICATIONS

International Search Report and Written Opinion for Application No. PCT/EP2022/072307, Mailed Sep. 11, 2022, 7 pages.

* cited by examiner

*Primary Examiner* — Erin Kryukova
(74) *Attorney, Agent, or Firm* — Duane Morris LLP

(57) ABSTRACT

Plectrum (1) for string musical instruments, comprising a body (2) divided in an attachment portion (5), a gripping portion (6) made with a rotation along its own longitudinal axis to modify in a desired manner the sliding and release features of the string of the instrument and/or to facilitate the gripping by the user.

3 Claims, 7 Drawing Sheets

PLECTRUM WITH A THREE-DIMENSIONAL STRUCTURE

FIELD OF APPLICATION

The present invention relates, in its more general aspect, to a plectrum for a string musical instrument, for example a guitar plectrum. Therefore, the technical field of the invention relates to the field of musical instrumentation.

PRIOR ART

As it is known, plectrums are small-sized accessories used to strain the strings of some musical instruments, for example guitar, bass or mandolin, so as to determine upon release a vibration which can be heard directly or through an amplifier.

Typically, the plectrum is a thin drop-shaped element of plastic material, whose end is meant to pluck the strings. However, plectrums of other material, for example metal ones, are also known.

The plectrum is generally held between the player's thumb and forefinger, which tighten the portion opposite the end plucking the strings. For particular needs, plectrums are also used, which provide a thimble or ring for attachment to the player's fingers, to which the above-described drop-like body is connected.

The plectrums currently produced on an industrial scale are generally obtained by die cutting, and therefore they have a uniform body thickness and a strictly planar structure.

Although substantially meeting the current market requirements, the above-discussed plectrums have nevertheless some drawbacks, briefly discussed hereafter.

A first limitation of plectrums according to the prior art, directly related to the mass production thereof and to the two-dimensional structure, is the poor specificity with respect to use. In fact, it is noted that, based on the music style, on the playing technique or even just on the specific player's preferences, different plectrum features may be required, in particular it can be required that the accessory strains the string of the instrument in a different manner. At present, the parameters which can be selected by the user are almost exclusively the thickness and the material; the result is an only partial adaptability of the plectrum to the requirements of use.

It is noted that, although plectrums with non-planar morphologies have been suggested in the past, they have never been developed with the specific aim of modifying the sliding and release features of the string of the instrument. These suggestions did not significantly improve the quality of the sound obtained and have never been produced and marketed on a large scale.

Another drawback is related to the stability of the gripping by the user. Since the handgrip portion is a smooth and thin element, it is not uncommon that during the performance of a piece of music the accessory escapes from the fingers, with obvious negative effects on the musician's performance.

Still another drawback is the possibility of breaking the plectrum during the performance of a piece of music, the higher the thinner the accessory is.

The technical problem underlying the present invention is therefore to devise a plectrum of a new type, which especially allows to meet specific performance requirements while being industrially manufacturable on a large scale at a low cost.

SUMMARY OF THE INVENTION

The above-identified technical problem is solved by a plectrum for string musical instruments, comprising a body divided in an attachment portion meant to contact the strings of the instrument and a user's gripping or connecting portion for a thimble, the body extending for a length L along a longitudinal axis between a tip of the attachment portion and a rear end of the gripping or connecting portion, wherein the body comprises at least one rotated portion. The side profile of the rotated portion is without angular points and lies along a twisted surface which connects, with a continuous twist, a first planar surface to a second planar surface, the first and second planar surfaces being intersected on the longitudinal axis and rotated by an angle of rotation $\alpha$ with respect to each other, with an extension P of the twisted surface measured along the longitudinal axis between the connecting point with the first surface and the connecting point with the second surface.

Continuous twist means an uninterrupted torsion along an entire section of the extension of the plectrum body, and preferably the twisted surface is a helicoid portion.

The above-described morphology allows the plectrum to be adapted in a desired manner to specific performance requirements, different sliding and release effects on the string being easily obtainable depending on the values selected for the angle of rotation $\alpha$ and for the extension P with respect to the length L. In particular, the curved side profile of the rotated portion can match the string with a controlled sliding based on the torsion gradient imparted to the rotated portion.

In fact, in view of the above, the torsion defined by the angle of rotation $\alpha$ can be alternatively carried out clockwise or counterclockwise, obtaining in the two cases different sonorities. In one case, the side profile which engages the string has a convex surface, facilitating a contact with an extended sliding and a softer sonority; in the other case, the side profile has a concave surface, the string release is abrupter, with a pronounced slingshot effect, and the sonorities are harsher.

A sensitive parameter for obtaining the plectrum according to the present invention is the ratio between the angle of rotation $\alpha$ and the dimensionless ratio P/L between extension and length, which defines the torsion gradient of the rotated portion.

The value $\alpha/(P/L)$ is kept equal or lower than 45°, for preventing pronounced valleys from being created on the profile, which would hinder the free sliding of the string to the detriment of the musical performance. Still preferably, the value $\alpha/(P/L)$ is equal or lower than 35°; still preferably it is equal or lower than 20°; still preferably it is equal or lower than 12.5°.

A further sensitive parameter in manufacturing the plectrum is the simple ratio between extension P and length L. Preferably, the ratio is at least equal to 0.5.

However, it is noted that it can also exceed the value 1, wherein the extension P is selected higher than the length L. In this case, the above-identified ideal twisted surface will lie at least partially outside the plectrum extension.

It is also noted that the first or second planar surface connected to the twisted surface, or both, can be contained, but not necessarily, in the plectrum plane. For example, the first planar surface can at least partially coincide with the attachment portion, while the second planar surface can at least partially coincide with the gripping or connecting portion.

In a preferred embodiment, the attachment portion is at least partially defined by the rotated portion, the curved side profile of the rotated portion being a sliding profile of the plectrum on the strings of the instrument.

In a particularly advantageous embodiment, the plectrum body has a thickening at the gripping or connecting portion, the thickening guaranteeing a dimensional stability of the rotated portion even when the gripping or connecting portion is strained by the user.

The above thickening can define in particular a gripping ergonomics, for example with depressions arranged to adapt to the player's fingertips.

Preferably, the thickening provides a differentiated morphology on the two opposite sides, by adapting to the gripping of the user's fingers: thumb on one face, forefinger on the opposite face. In this case the thickening can be asymmetrical.

Alternatively, the thickening can be a simple increase of the thickness of the plectrum body at the gripping or connecting portion.

Preferably, the body can be made by injection moulding, for example of a polymer material such as polycarbonate or nylon.

The above thickening can be partially made of a different material with respect to the rest of the body, for example of synthetic rubber, by an overmoulding technique.

Alternatively, the thickening can be made of the same material as the rest of the plectrum body, but have an increased surface roughness for facilitating the gripping. The increase of the surface roughness can be obtained for example by electrical discharge machining on the mould localized at the above thickening.

According to still another alternative, for making the thickening an appropriate paint can be used, which confers a locally yielding consistency to the handgrip portion.

Advantageously, the plectrum body can have a non-uniform thickness, even outside the possible gripping thickening. For example, the body can have a peripheral edge of the attachment portion with a lower thickness with respect to a central core of the same attachment portion. A structural solidity is thereby conferred to the piece even where the edge contacting the strings is selected suitably thin, thus avoiding the risks of breaking the accessory.

In a variant of the plectrum according to the present invention, the gripping or coupling portion is at least partially defined by the rotated portion and the angle of rotation is lower than 15°, the twist of the rotated portion facilitating the user's gripping.

As mentioned above, in the plectrum according to the present invention one or more construction features are parameterized with respect to specific requirements of use, the construction features being intended to include: angle of rotation, right-handed and left-handed pattern of rotation, material, shape of the tip and shape of the edge of the attachment portion. Advantageously, the construction features can be identified on the plectrum itself or on a package thereof, for example by means of a one-dimensional or two-dimensional bar code.

Due to this arrangement, sellers and buyers can easily identify the plectrums which are suited to specific requirements by inspecting the product or the package thereof.

It is finally noted how the asymmetries introduced in the plectrum according to the present invention, in particular the right-handed or left-handed twist and the gripping ergonomics, can be reproduced in a mirror-like way to satisfy left-handed users.

Further features and advantages of the present invention will be apparent from the following description of different preferred embodiments given by way of non-limiting examples with reference to the attached drawings.

DETAILED DESCRIPTION

Figure 1:
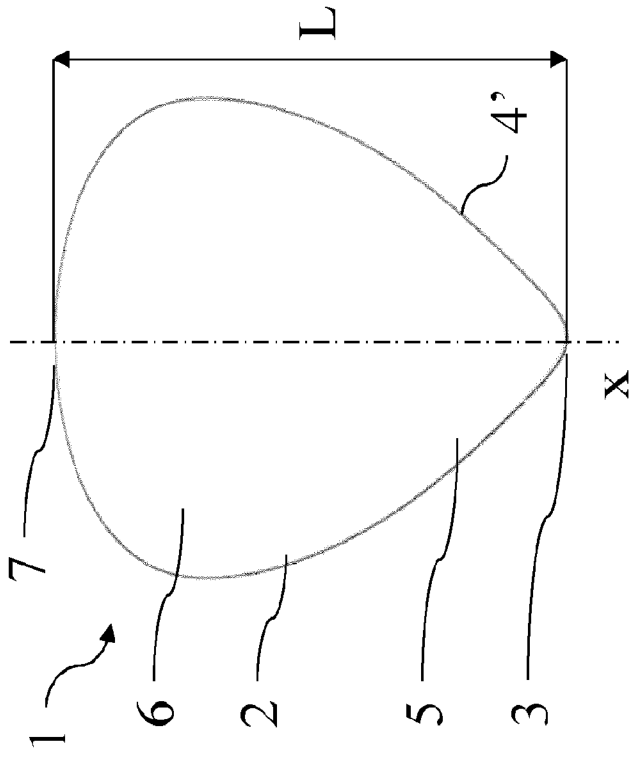
FIG. 1 represents a top view of a first variant of a plectrum according to the present invention.
Figure 2:
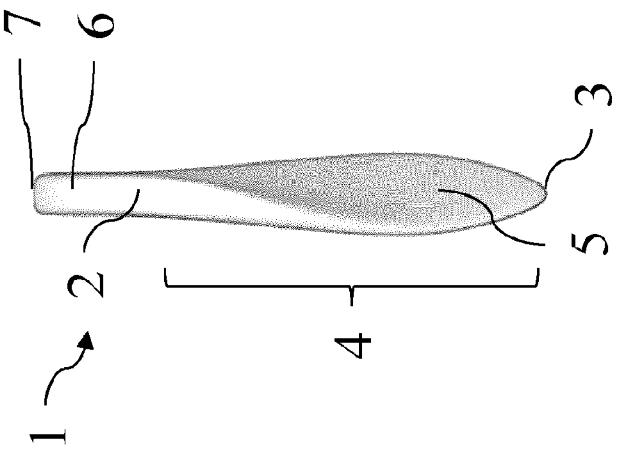
FIG. 2 represents a side view of the plectrum of FIG. 1.
Figure 3:
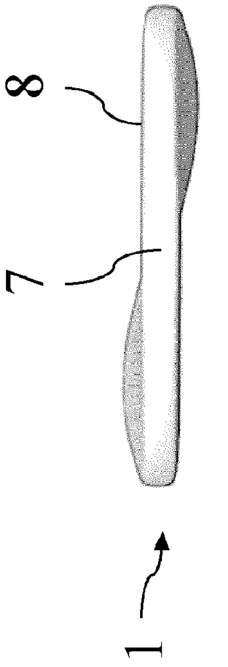
FIG. 3 represents a rear view of the plectrum of FIG. 1.
Figure 4:
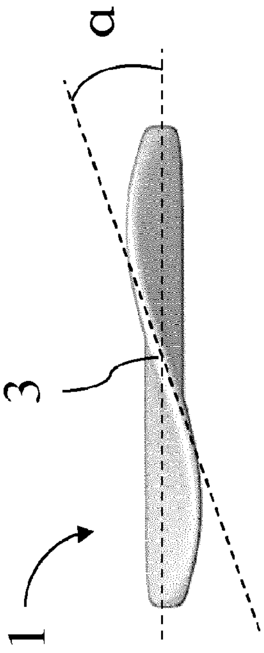
FIG. 4 represents a front view of the plectrum of FIG. 1.
Figure 5:
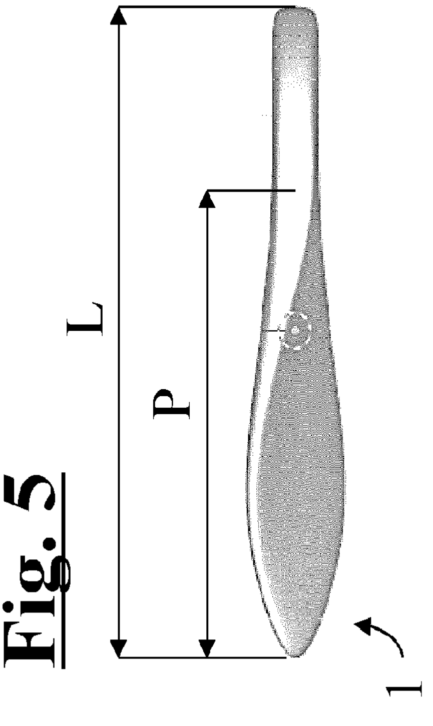
FIG. 5 represents once more the front view of FIG. 2, introducing parametric dimensions of interest.
Figure 6:
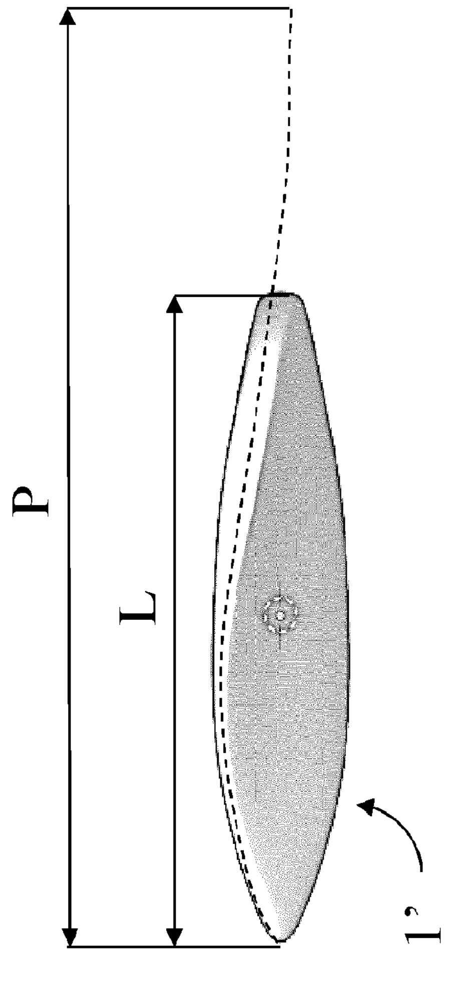
FIG. 6 represents a side view of a second variant of the plectrum according to the invention, with parametric dimensions which are similar to those identified in FIG. 5.

With reference to the attached figures, eight different variants of the plectrum according to the present invention are generally indicated with 1, 1', 1", 1'", 1"", 1""', 1""", 1"""'.

The first variant of the plectrum 1 is described in detail hereafter, while for the following variants only the peculiarities which differentiate them from the first variant are described. It is noted that the plectrum portions are identified with the same numeral identifiers in the different variants.

The plectrum 1 according to the first variant provides a traditional drop-like shape, with an extension along a longitudinal axis x extending from a rear end 7 up to a tip 3. The plectrum has a length L measured along the above longitudinal axis x. As it is known per se, the plectrum 1 provides a gripping portion 6 meant to be tightened between the user's fingers and an opposite attachment portion 5, comprising the tip 3. The attachment portion has a side profile 4', without angular points, which impacts on the strings of the instrument and slides thereon until release.

The plectrum 1 has a non-uniform surface, having in particular a thickening 8 at the gripping portion 6.

The plectrum 1 is characterized by the presence of a rotated portion 4. The portion lies on an ideal surface which connects, with a continuous twist, a first planar surface to a second planar surface, the first and second planar surfaces being intersected on the longitudinal axis x and rotated by an angle of rotation a with respect to each other. In the illustrated embodiment, the angle is equal to 25°.

It is noted that the twisted surface develops from the tip 3 up to about 75% of the length L, at the gripping portion 6. The extension of the twisted surface measured along the longitudinal axis between the connecting point with the first surface and the connecting point with the second surface is defined with P. In this case, the extension P is equal to 0.75 L, i.e. the rotated portion 4 develops from the first connecting point, at the tip 3, up to the second connecting point, at the gripping portion 6.

There is therefore a value of the ratio $\alpha/(P/L)$, which defines the torsion gradient of the rotated portion 4, being just higher than 33°.

Figure 7:
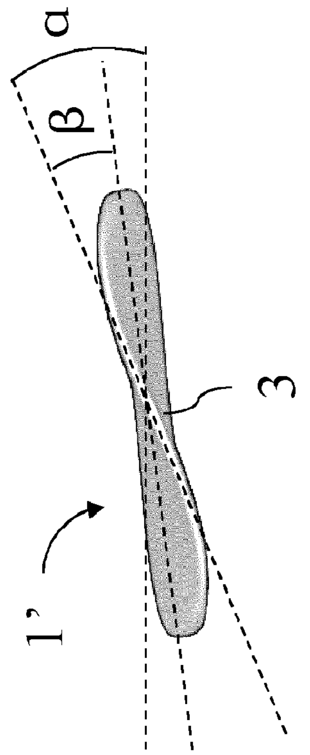
FIG. 7 represents a front view of the plectrum of FIG. 6.
Figure 8:
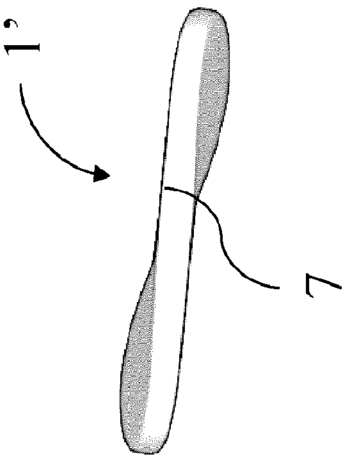
FIG. 8 represents a rear view of the plectrum of FIG. 6.
Figure 9:
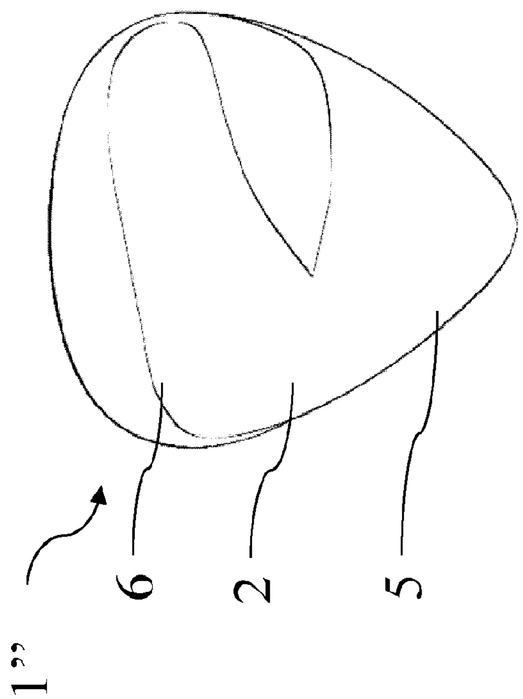
FIG. 9 represents a top view of a third variant of a plectrum according to the present invention.
Figure 10:
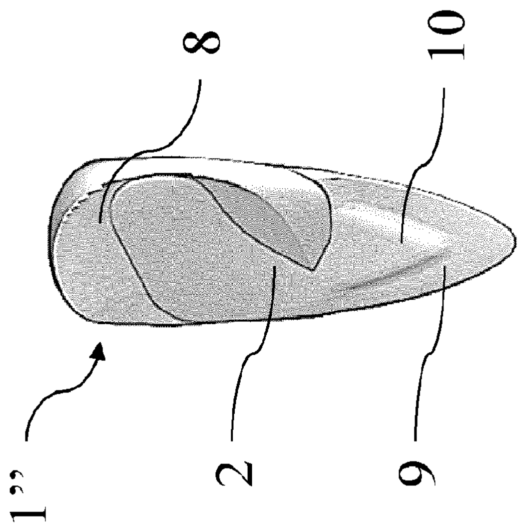
FIG. 10 represents a perspective view of the plectrum of FIG. 9, from a side point of view.
Figure 11:
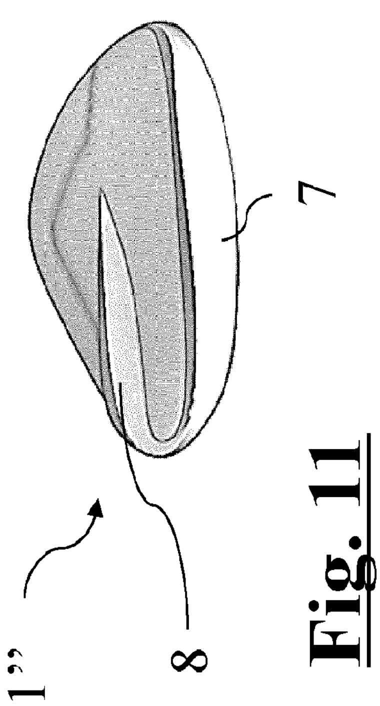
FIG. 11 represents a perspective view of the plectrum of FIG. 9, from a rear point of view.
Figure 12:
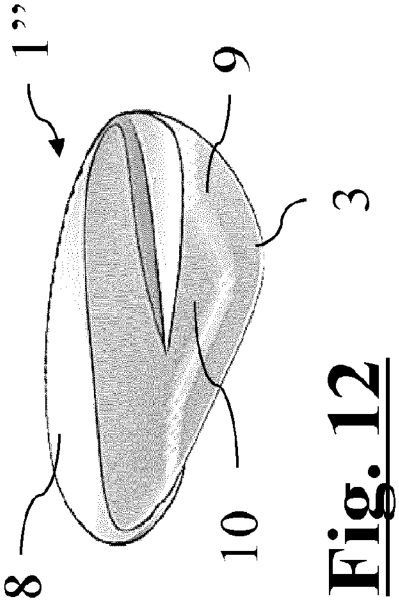
FIG. 12 represents a perspective view of the plectrum of FIG. 9, from a front point of view.
Figure 13:
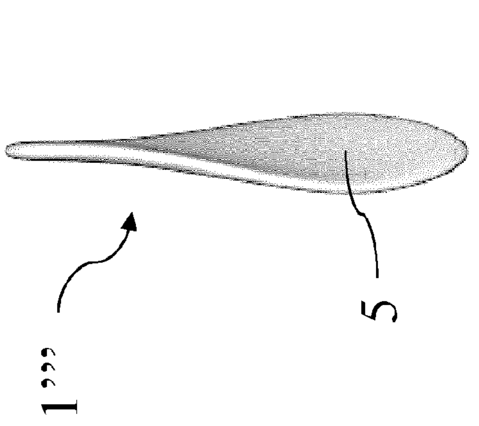
FIG. 13 represents a side view of a fourth variant of a plectrum according to the present invention.
Figure 14:
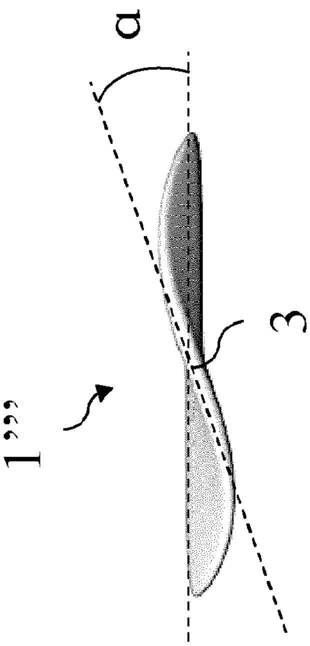
FIG. 14 represents a front view of the plectrum of FIG. 13.
Figure 15:
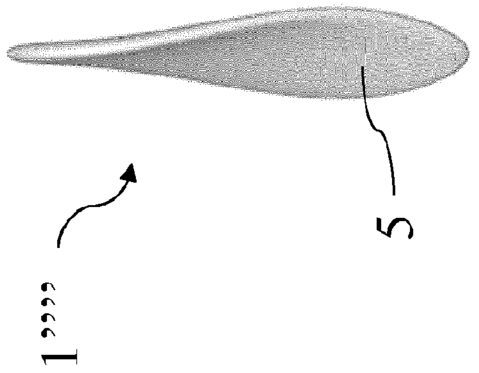
FIG. 15 represents a side view of a fifth variant of a plectrum according to the present invention.
Figure 16:
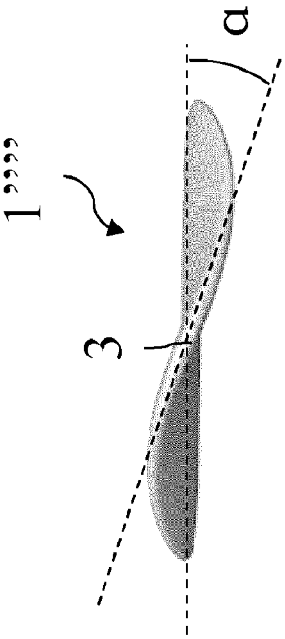
FIG. 16 represents a front view of the plectrum of FIG. 15.
Figure 17:
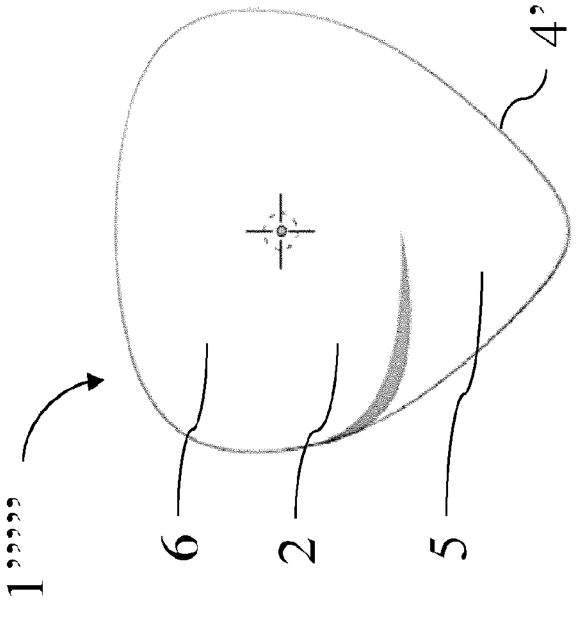
FIG. 17 represents a top view of a sixth variant of a plectrum according to the present invention.
Figure 18:
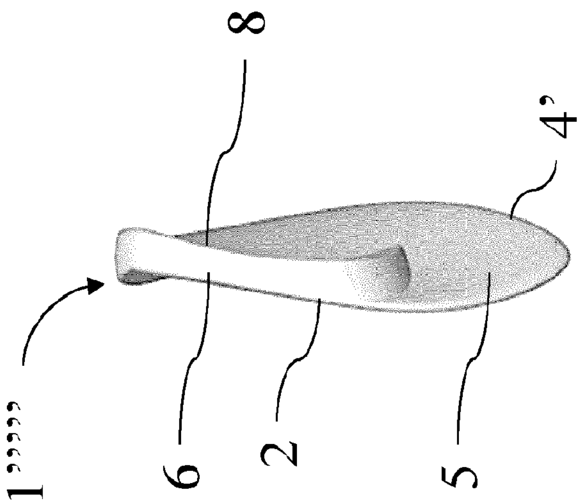
FIG. 18 represents a side view of the plectrum of FIG. 17.
Figure 19:
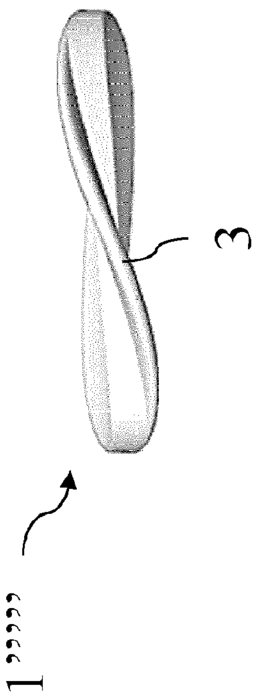
FIG. 19 represents a front view of the plectrum of FIG. 17.
Figure 20:
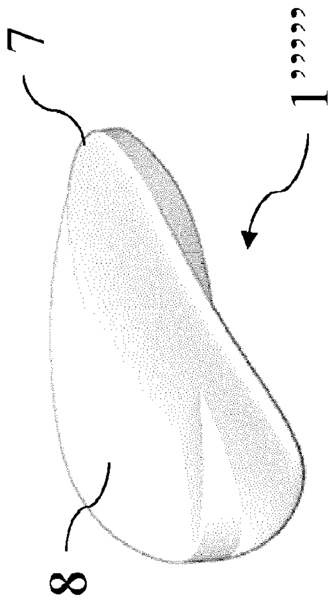
FIG. 20 represents a perspective view of the plectrum of FIG. 17, from a front point of view.
Figure 21:
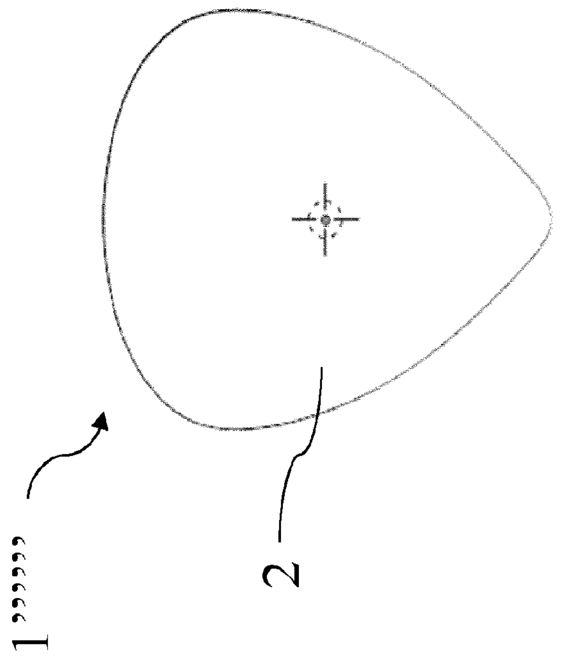
FIG. 21 represents a top view of a seventh variant of a plectrum according to the present invention.
Figure 22:
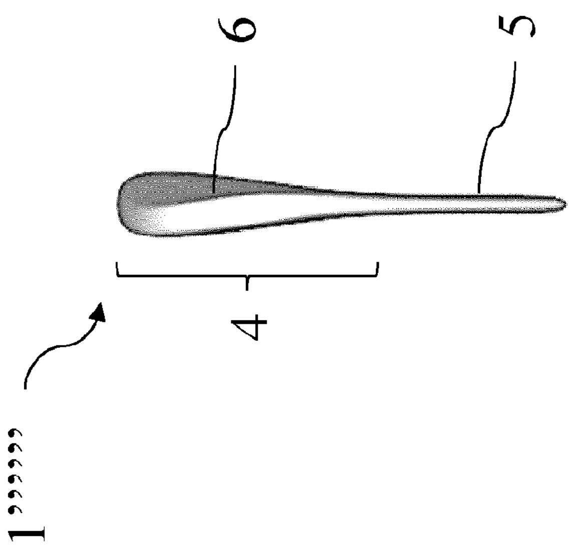
FIG. 22 represents a side view of the plectrum of FIG. 21.
Figure 23:
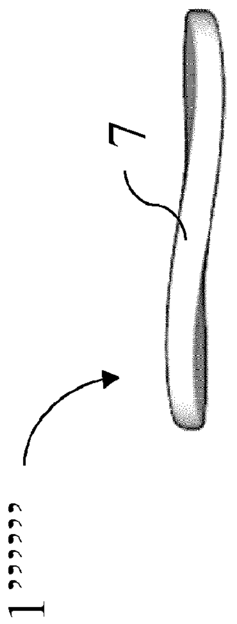
FIG. 23 represents a rear view of the plectrum of FIG. 21.
Figure 24:
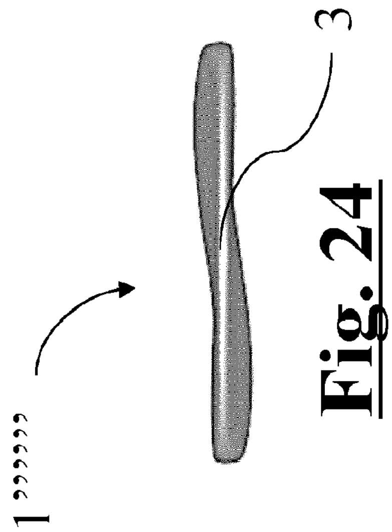
FIG. 24 represents a front view of the plectrum of FIG. 21.
Figure 25:
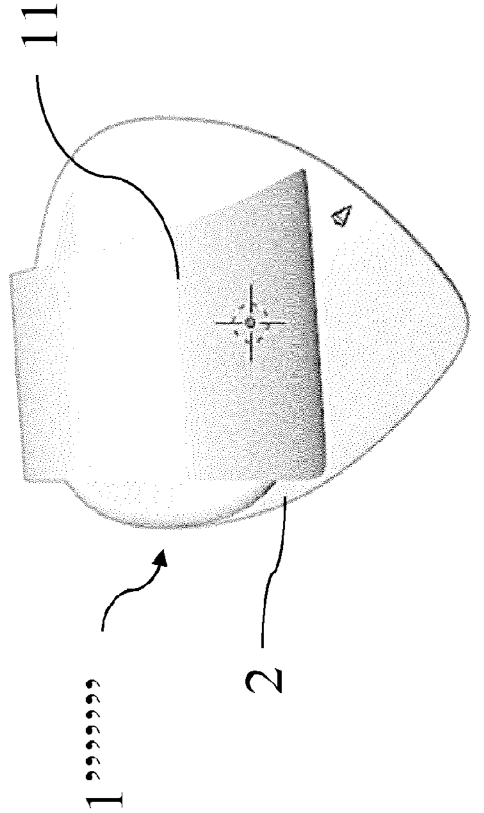
FIG. 25 represents a top view of an eighth variant of a plectrum according to the present invention.
Figure 26:
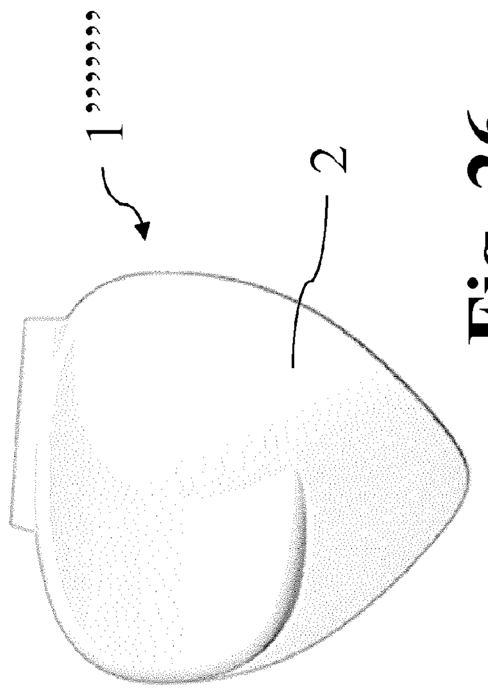
FIG. 26 represents a bottom view of the plectrum of FIG. 25.
Figure 27:
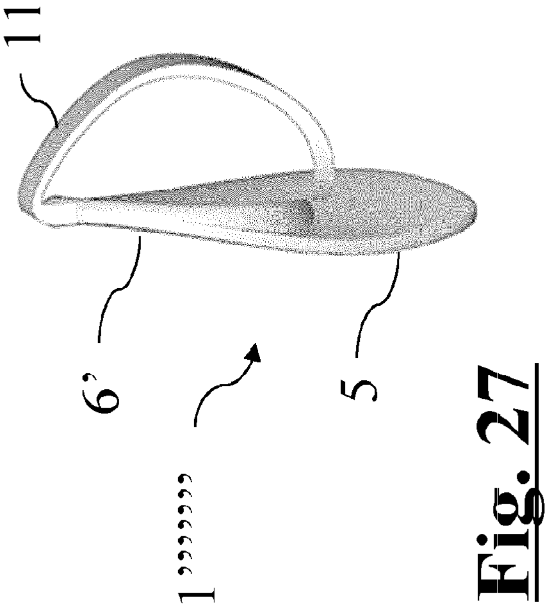
FIG. 27 represents a side view of the plectrum of FIG. 25.
Figure 28:
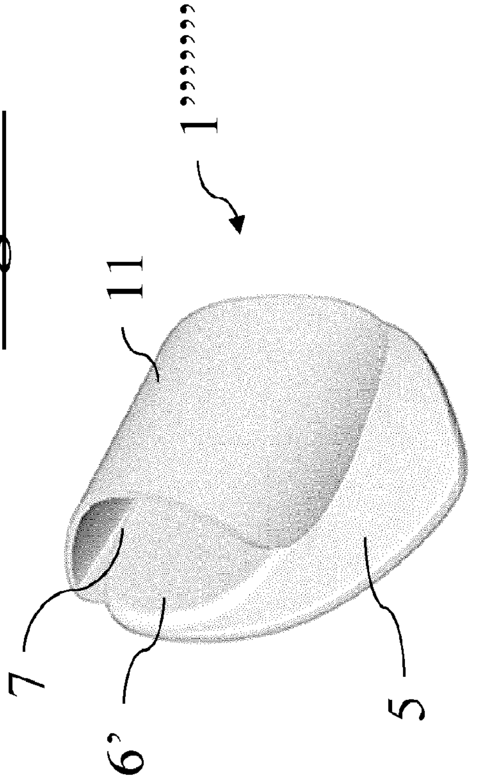
FIG. 28 represents a perspective view of the plectrum of FIG. 25, from a top point of view.

The plectrum 1' in accordance with the second variant differs from the previous one only in that the extension P is higher than the length L, in particular it is equal to 1.5 L. In this case, as can be seen in FIG. 7, the plectrum does not complete the torsion defined by the twisted surface: in other words the angle β between the tip 3 and the rear end 7 is lower than the angle of rotation α, which remains equal to 25°.

There is here a value of the ratio $\alpha/(P/L)$, which is considerably lower than the previous one, being equal to about 17°.

The plectrum 1'' according to the third variant is represented without emphasizing the rotation of the rotated portion 4.

Two further arrangements aimed at improving the accessory strength and ergonomics are instead pointed out.

On the one hand, the attachment portion 5 has a peripheral edge 9 of the attachment portion with a lower thickness than a central core 10, so as to improve the mechanical strength even for reduced values of the edge thickness.

On the other hand, the thickening 8 of the gripping portion 6 defines here a gripping ergonomics, with differentiated shapes for the forefinger and the thumb which hold the plectrum 1''.

The above-mentioned thickening 8, as already indicated in the summary of the invention, can be made by overmoulding.

The fourth variant 1''' and the fifth variant 1'''' of the plectrum, represented in FIGS. 13-16, are suggested to show the possibility of alternatively rotating the attachment portion 5 clockwise and counterclockwise. As explained in the summary of the invention, the different directions of rotation achieve different melodic effects, and can be equally desirable depending on the specific contexts of use.

The sixth variant of the plectrum 1''''' has an extension P which is considerably higher than the length L, so that the whole profile of the accessory should be twisted. On the other hand, the thickening 8 defines here an additional thickness which embeds and makes the gripping portion 6 substantially plane. The thickening 8 has here a double function: besides facilitating the gripping, as in the previous variants, it stabilizes the torsion of the attachment portion 5. In fact, if the whole body 2 was rotated, without any kind of additional thickness, the user's gripping would deform the gripping portion 3 bringing it closer to planarity, consequently deforming the attachment portion 5 and altering the profile 4' selected by the musician.

In the seventh variant of the plectrum 1'''''', the rotated portion 4 coincides with the gripping portion 6, which is also suitably thickened with respect to the attachment portion 5. The torsion, limited to an angle of rotation α not exceeding 15°, serves in this case not for acoustic considerations but for the purpose of further facilitating the gripping by the user.

Finally, the eighth variant of the plectrum 1''''''' differs from the previous ones in that it comprises, instead of the gripping portion seen in the previous embodiments, a connecting portion 6' which connects the body 2 to a thimble or ring 11, which is known per se, for the insertion of a user's finger.

It is noted that, for the purpose of identifying the length parameter L, the rear end 7 of the connecting portion 6' is set at the start of the bending which defines the thimble or ring 11.

Obviously, in order to meet contingent and specific requirements, a person skilled in the art will be allowed to bring several modifications and alternatives to the above-described plectrum, all however falling within the scope of protection of the invention as defined by the following claims.

The invention claimed is:

1. A plectrum (1; 1'; 1''; 1'''; 1''''; 1'''''; 1''''''; 1''''''') for string musical instruments, comprising a body (2), said body (2) extending for a length (L) along a longitudinal axis (x) between a tip (3) and a rear end (7), divided into a portion aimed to get in contact with the strings of an instrument and a gripping portion, characterized in that said body (2) comprises at least one rotated portion (4) whose side profile (4') is aimed to get in contact with the strings, wherein the side profile (4') of the rotated portion (4) is without, angular points and extends along a torsion-completing twisted surface which connects, with a continuous twist, a first planar surface to a second planar surface, being intersected on the longitudinal axis (x) and rotated by an angle of rotation (α) with respect to each other, with an extension (P) of the twisted surface measured along the longitudinal axis (x) between a first connecting point being the tip of the plectrum and a second connecting point being another end of the twisted surface, wherein, given the ratio (P/L) between extension (P) and length (L), the angle of rotation (a) is equal or lower than 45° times said ratio (P/L), i.e. $45°\cdot(P/L)$.

2. The plectrum according to claim 1, wherein the angle of rotation (α) may take either positive or negative values.

3. The plectrum according to claim 1, P exceeding L, and the gripping portion being included in the rotated portion.

* * * * *